(No Model.)  6 Sheets—Sheet 1.

J. G. YOUNG, Jr.
PAPER BOX MACHINE.

No. 471,930.   Patented Mar. 29, 1892.

Witnesses

Inventor
John G. Young Jr.
by Spear & Welch
Attys.

(No Model.) 6 Sheets—Sheet 2.

J. G. YOUNG, Jr.
PAPER BOX MACHINE.

No. 471,930. Patented Mar. 29, 1892.

Fig. 2.

Witnesses

Inventor
John G. Young, Jr.
by Spear & Welch
Attys.

(No Model.)  6 Sheets—Sheet 5.

J. G. YOUNG, Jr.
PAPER BOX MACHINE.

No. 471,930. Patented Mar. 29, 1892.

Witnesses

Inventor
John G. Young Jr
by Spear & Welch
Attys.

(No Model.) 6 Sheets—Sheet 6.

J. G. YOUNG, Jr.
PAPER BOX MACHINE.

No. 471,930. Patented Mar. 29, 1892.

Witnesses

Inventor
John G. Young Jr.
by Spear + Welch
Attys

UNITED STATES PATENT OFFICE.

JOHN G. YOUNG, JR., OF HYDE PARK, MASSACHUSETTS, ASSIGNOR OF ONE-HALF TO EDWARD B. PENDLETON, OF SAME PLACE.

PAPER-BOX MACHINE.

SPECIFICATION forming part of Letters Patent No. 471,930, dated March 29, 1892.

Application filed June 18, 1891. Serial No. 396,757. (No model.)

*To all whom it may concern:*

Be it known that JOHN G. YOUNG, Jr., a citizen of the United States of America, residing at Hyde Park, in the county of Norfolk and Commonwealth of Massachusetts, have invented certain new and useful Improvements in Paper-Box Machines, of which the following is a specification.

My said invention relates to that class of box-making machines in which the boxes are made upon a former out of sheets of paper or other thin material turned up upon the sides of the formers to form the sides of the box.

The general organization of the machine includes a movable plunger, a yielding table or bed-plate on which the sheet is laid of which the box is formed, and movable wings for turning the edges of the sheet up against the sides of the former for the sides of the box.

It also includes feeding mechanism by means of which the sheets are supplied to the plate underneath the former and devices for removing the finished box.

It further includes devices by means of which the side-forming wings are operated, in connection with the movement of the plunger and by the force of it.

The invention also includes important details of construction, all of which, together with the general plan or principle of the machine, are hereinafter fully explained, and are illustrated in the accompanying drawings, in which—

Figures 1, 17, 18:
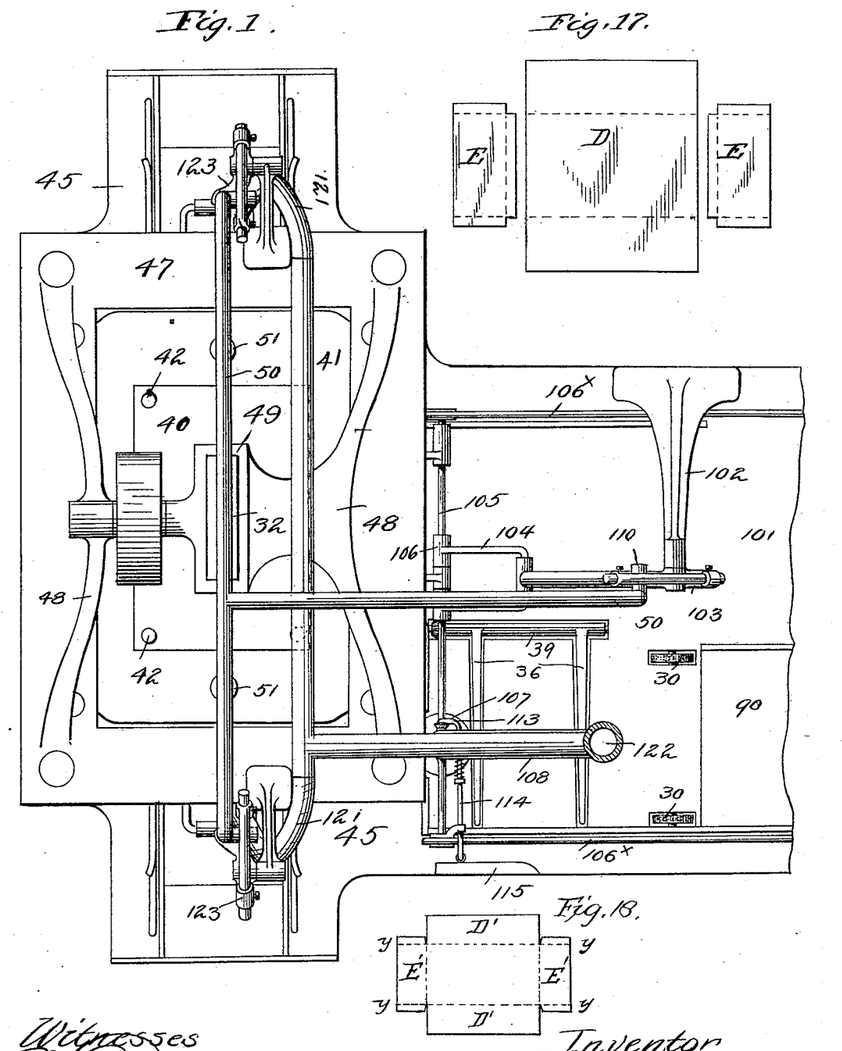
Figure 1 shows in plan a top view of the machine, and Fig. 2 a front elevation.
Fig. 17 shows a plan of the blanks made of separate pieces.
Fig. 18 is a view of the blank formed from a single sheet of material.
Figure 2:
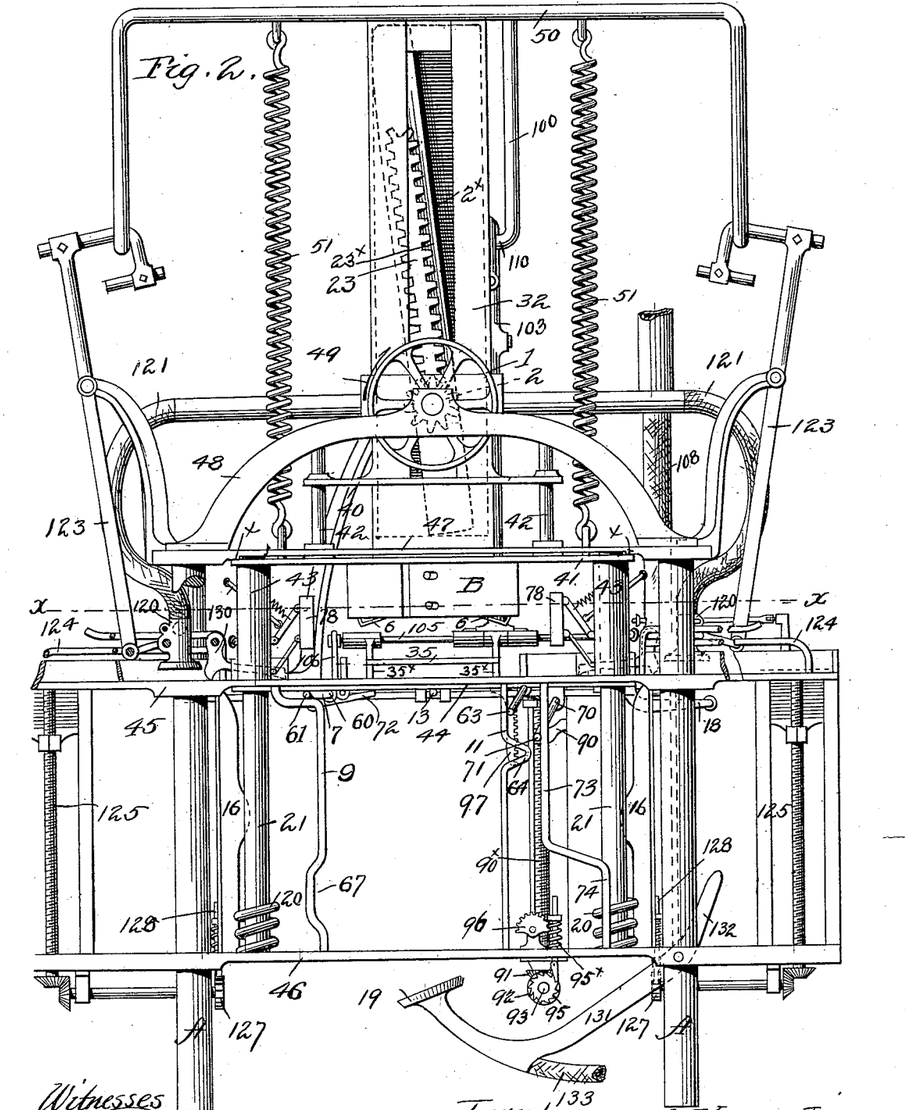

The main supporting-frame in shown more clearly in Figs. 1 and 2. It has an upper and lower table 45 and 46, supported upon four legs. The legs extend above the upper table 45 and support, also, a top 47, above which is a frame 48, in which is the bearing of the driving-shaft, which carries a fixed driving-pulley 1. It has also a guiding-collar 49, in which the plunger 32 reciprocates, being operated by a pinion 2 on the main or driving shaft through mechanism hereinafter particularly described. On the lower end of the plunger is fixed the former B. This may be a solid block in size and shape fitted to form a box of the required dimensions, or it may, as hereinafter described, be a hollow box collapsible to permit free removal of the boxes. It is in the machine shown rectangular, having plain sides and a plain bottom, and it reciprocates in a right line at right angles to the plane of the tables and feed of the sheets.

For convenience I describe the parts of the machine as it is arranged in the drawings, with the plunger and former moving in vertical line. Upon the plunger above the former is fixed a horizontal plate or frame 40, having holes at the four corners fitting guide-posts 42, set in the top plate 41 of a vertically-movable bed-plate frame. The plate 41 is fixed to sleeves 43, one at each corner, which sleeves connect the top plate 41 and bed-plate 44 and slide upon posts 21, fixed in vertical position in the main frame. The former and plunger descend in unison, but without the other parts of the forming mechanisms, until the plate or frame 40 comes in contact with the shoulders on the lower ends of the posts 42. At this point the bottom of the former comes into contact with the sheet, which before its descent has been deposited under the plunger. It will be understood from the description just given that the plunger in this first part of its movement passes through an opening in the top plate 41. On the upper end of the plunger is a cross-bar 50, to which are connected the upper ends of coiled springs 51, their lower ends being connected to the top plate 41. This top plate is in the position shown in Fig. 2 at the upper limit of its movement, being arrested by a stop consisting of the top plate of the main frame, against which the plate 41 bears, as at $x$, Fig. 2. The springs are under tension and remain under tension when the plate or frame 40 reaches the shoulders on posts 42. The lower ends of the sleeves 43 are fixed to the bottom plate 44 of the bed-plate frame, on which the sheets are deposited, and the tension of the springs 51 hold this bottom plate firmly against the sheet, so that the latter is clamped between the bottom of the former and the bottom plate and is so held during the further downward movement of the former in which the sides of the box are formed. The bottom plate 44 has an opening fitted in size and shaped to permit the former, with the box thereon, to pass into the opening and the box to pass through and be discharged from the former after it has been completed. This opening is closed until the proper time by trap-doors 55, held in place by mechanism hereinafter described.

Figure 4:
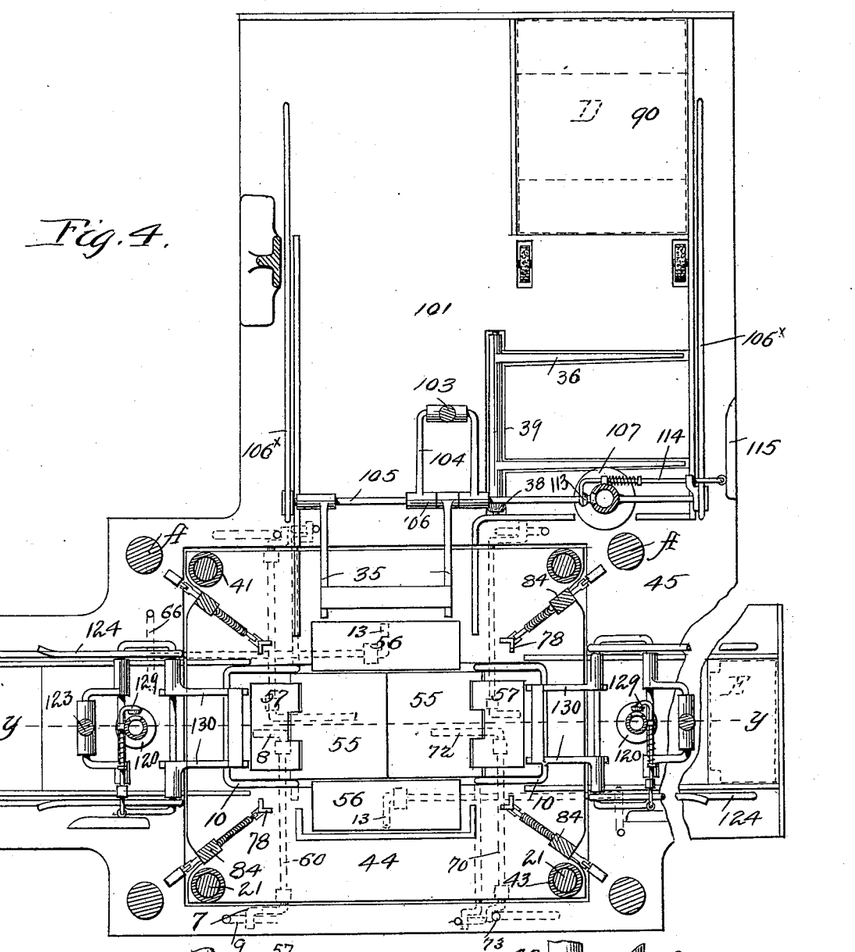
Fig. 4 shows a section in plan on line $x$ $x$ of Fig. 2.
Figure 5:
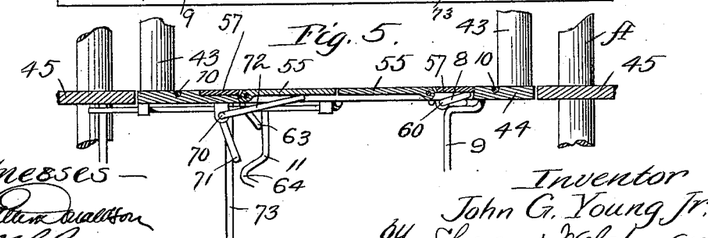
Fig. 5 shows a vertical section on line $y$ $y$ of Fig. 3.
Figure 6:
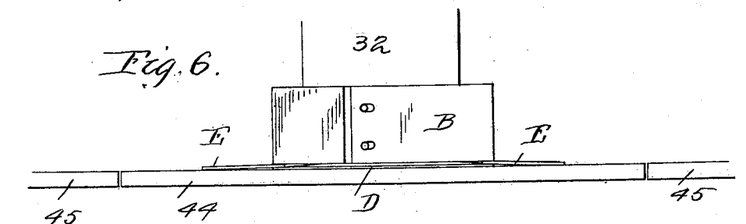
Figs. 6 to 11, inclusive, show the former and wings, the former being in side elevation and the wings in the positions which they successively assume in forming the sides of the box.
Figure 7:
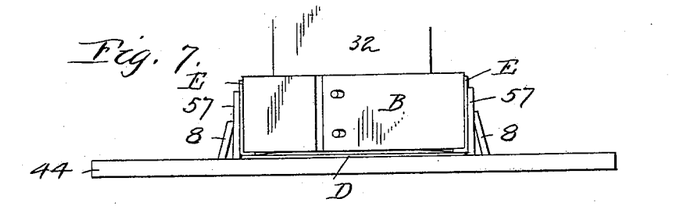
Figure 8:
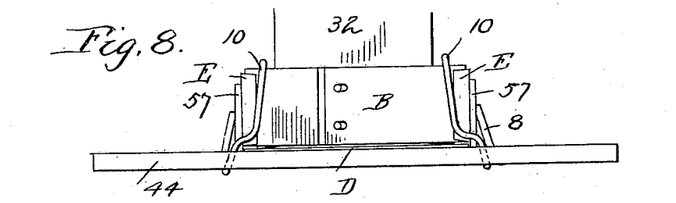
Figure 9:
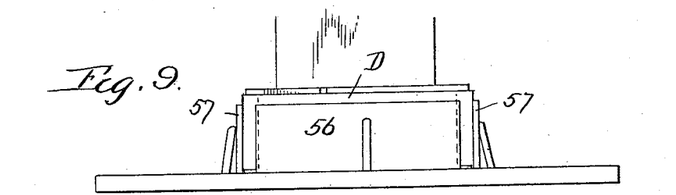
Figure 10:
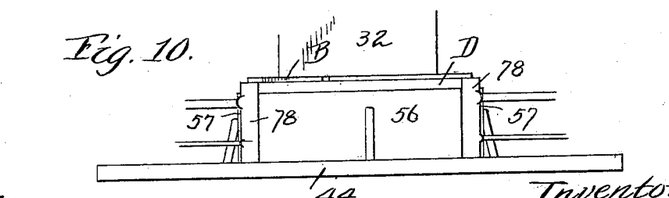

Upon the margin of the opening in the plate 55 are hinged the wings which form the sides of the box by folding the margin of the blank sheet against the sides of the former. These wings are shown as open or lying back upon the plate 44 in Fig. 4. The plunger is shown as longer one way and the opening so corresponds. For convenience I refer to the longer wings as "side" wings and to the shorter as "end" wings. The side wings are marked 56 and the end wings 57. They are so hinged as to fold up snugly and squarely against the sides and ends of the former. They are operated by the advance of the plunger, carrying the former and plate or table 44 in the same movement, with the blank sheet clamped, as heretofore explained. The wings are operated in this advance movement by cranks coming into contact with bent rods or posts, the bends of which act as cams or cam-faces, being stationary and acting upon the wings as the former advances. The bent rod which operates one of the end wings is illustrated in Fig. 2 at 9. This rod acts upon the wing on the left-hand end in that figure. A rod exactly similar is located on the other side of the machine (not shown in the figures) for operating the wing at the right-hand end of the machine. In this figure the end wing does not appear, as it lies on the plate 44 and behind the edge of the top 45. The shaft which operates the wing 57 is shown at 60 and its crank at 7, the wrist-pin 61 of the said crank extending over the horizontal or nearly horizontal part of the operating-rod 9. The shaft 60 turns in bearings in the plate 44 on the under side and has an arm 8 extending up through a slot in the plate 44 and bearing upon the under side of the wing. The nearly horizontal part of the rod curves downward to the high part of the cam-path on said rod, which is straight, and as the plate carrying the wings descends the wrist-pin travels over the curved part of the rod onto the straight high part, and thus closes or folds up the wing against the end of the former. The same operation takes place at the same time on the other end of the plate, the wings at both ends having the same form of shaft and crank and wrist-pin. It will be understood that the blank sheet of proper form is first placed upon the plate. This is shown in Fig. 18. The blank is of rectangular form, with the corners removed, the parts D' forming the side and of approximately the same length as the side of the former; but the parts E', which form the ends of the box, are wider than the said ends, so that when folded up the lateral margins outside the dotted lines $y$ shall extend beyond the ends, and when bent around on the sides, as hereinafter explained, shall form, with the sides of the blank, lap-joints. A special construction of this blank is hereinafter described, but the form is the same. The ends of the blank being bent up and held, as explained, the overlapping edges are now to be bent around on the sides of the former. This is done by means of a loop 10, which is hinged in the plate 44 by hinges in the same plane with those of the wings 57. It lies normally flat on the said plate, as shown in Fig. 5, and it is so arranged that when swung up it may pass partly over the end of the former, as shown in Fig. 8. This loop when moved bends the lateral margins of the part E of the blank around upon the sides of the former after said part has been folded up against the end. The shaft of the loop 10 is shown on the right-hand end of Fig. 2. It has a crank and horizontally-extending wrist-pin 63, which bears against the straight low part of an operating-rod 11 when the loop is down, as shown in Fig. 2. As the plate 44 descends, this wrist-pin slides down on the rod until it strikes the high part 64, which is formed by a sharp bend, and reverses back to the line of the upper straight part. This sharp bend gives a quick movement and return to the loop, and returns it to its normal position; but the movement of the sides of the loop being close to the sides of the former bends the edges of the part $e$ sharply and closely to the former. The loop of the left-hand end of Fig. 2 is the same, with the same form of operating parts as just described, these operating parts being placed on opposite sides, so as not to interfere with the mechanism for operating the end wings. A spring (not shown) on the shaft of the loop returns it to its normal position, in which it remains while the wrist-pin slides upon the straight part of the rod below the bend. The side wings are operated by the same form of mechanism by which the end wings are moved, and their movement in closing upon the former follows that of the loops, the order being, first, the end wings; second, the loops, and, third, the side wings.

Figure 3:
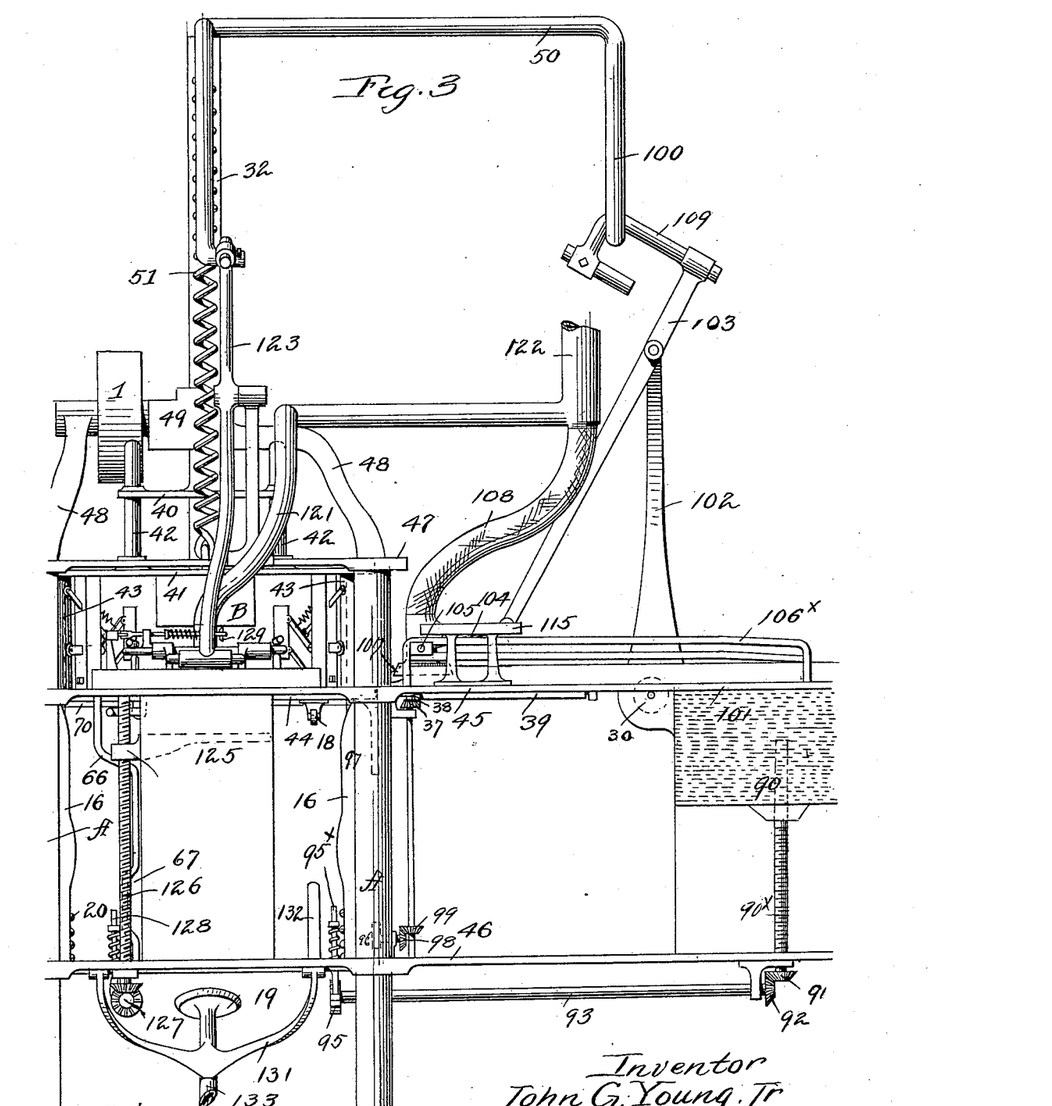
Fig. 3, a side elevation.

The rod 66, which operates the wrist-pin of the crank-shaft of the side wings, is the same as the rod 9, except that its upper bend is on a lower plane than that of the rod 9. An arm 13 of this shaft extends up through a slot in plate 44 and bears upon the under side of the side wings. The rod 66 is shown in Fig. 3, it operating the left-hand-side wing of that figure. The rod of the other wing is on the opposite end of the machine, and is not shown, but is precisely the same. The side and end wings are all held to the former by the straight high parts of their operating-rods during a considerable part of the movement of the former as it descends to give the glue or paste on the box time to set firmly. On the lower ends of the rods are low parts formed by bends, as at 67, when the wings are released and fall back near their normal or lower position.

It will be understood that the trap-doors 55 are required to be kept closed until the box is formed and ready to be discharged. These doors are hinged at the margins of the ends of the opening, so that when swung up and closed they form part of the plate 44. A crank 70 of a shaft hung in bearings parallel with and just back of the door-hinge on the under surface of the plate 44 has a wrist-pin 71, which bears upon a rod 73 similar in character to the rods 9. The upper part is straight and high to hold the door closed until the plate is at the discharge-point, when the wrist-pin drops over a bend on the low part 74 of the rod and releases the door. The door is held by an arm 72 on the inner end of the shaft, this arm extending under the central part of the door, as shown in Fig. 2. The closing of the doors is effected as the wrist-pins 71 ride up the bends above the straight parts 74.

Figure 14:
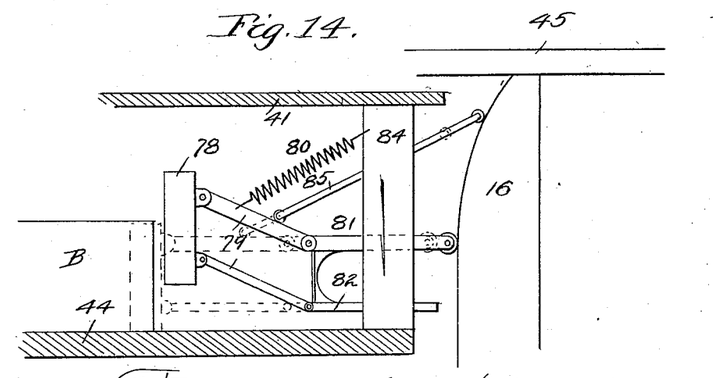
Fig. 14 shows, in side elevation, and on a larger scale than that of the wings in Figs. 6 to 11 the corner wings, by means of which the corners of the box are pressed to the former.

The wings do not extend quite to the corners in the form of machine which I have herein shown, and I have provided presses for forming the corners. These presses have the general characteristics of the wings hereinbefore described, and they are brought into contact with and pressed against the corners of the box formed upon the former in order to give their corners proper shape and to press the lap snugly together. These corner-presses are in the principal form shown composed of angle-irons, being in rectangular form, as shown at 78 in Fig. 4. They are set diagonally, as shown in that figure, and are supported upon bars 81 and 82, Fig. 14, these bars sliding horizontally in posts 84 on the plate 44. The corner-presses are connected to these sliding bars by links 79, and there is a spring 80 connected to the upper link, by means of which the presses are normally held up (so the blanks can be fed, whether they are made in one piece or several pieces) and back out of contact with the box of the former. A push-rod 85, sliding in an inclined hole in the post 84, has its lower end in contact with the upper link and its upper end bearing on a fixed cam 16. As the former descends, carrying the plate 44, and after the wings have operated, the push-rod 85 is advanced by the cam 16 and the corner-press 78 is swung forward from a backwardly-inclined position down to a vertical position, so that the links are brought into line with the bars 81 82. Further movement pushes the bars forward and clamps the presses upon the corners by direct horizontal movement, the final position being shown in dotted lines in Fig. 14, where the parts are shown on a larger scale.

Figure 15:
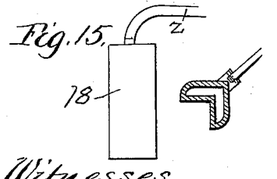
Figs. 15 and 16 further illustrate details of construction.
Figure 16:
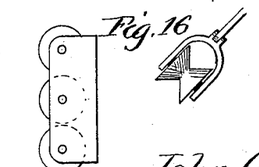

In Figs. 15 and 16 I have shown modified forms of these corner-presses, the first being hollow and having a pipe $z$ for leading hot air, steam, or hot water to the interior to hasten the setting of the glue or paste. In the second modified form, Fig. 16, angular rollers are shown, which may be pressed against the corners by the cam 16 as the press is brought down by the push-rod 85. The cam 16 has a prolonged high part to keep the corner-presses against the box as long as possible. If necessary, I may use a double cam to better facilitate the action of the corner-presses.

In the machine so far described ordinary blanks of paper or other suitable material of plain rectangular form, excepting that the corners are removed, as heretofore explained, may be fed to the plate beneath the former by hand; but to avoid this expense in the running I have devised means for automatically feeding the blanks to the machine. This device may be used with entire blanks, or blanks made in one piece, as heretofore explained; but for economy of material I have constructed the machine to feed the blanks in three parts, so that there shall be no waste of material by cutting out the corners. These blanks are formed as shown in Fig. 17, in which the central part D forms the bottom and sides and the pieces E E form the ends, and are intended to be pasted upon the piece D at the margins indicated by the dotted lines. In this form the blank D is in width equal to the length of the former, and in length equal to the width of the former (or box) plus twice the depth. The length of the pieces E E one way equals the depth of the box plus the necessary lap upon the bottom, and transversely they are equal to the width of the box plus the necessary lap on each side to form the corners, as heretofore explained. The positions of the feeding mechanisms are shown in Fig. 4. The projecting part of the table on the upper part of the figure is that which feeds the part D, while the right and left hand projections feed the end blanks or pieces E E.

I will describe first that part which feeds to the table the pieces D, these being first placed under the former, while it is raised to the upper limit of its movement. The sheets or blanks D are first piled upon the vertically-moving carriage 90, being thereon properly laid. This table, Figs. 3 and 4, is raised step by step by means of a vertically-arranged screw $90^\times$, Figs. 2 and 3, turning in bearings in the main frame and threaded into a nut on the carriage 90. At its lower end it has a fixed bevel-gear 91, which is in mesh with another bevel-gear 92 on a horizontal shaft 93, which extends underneath the plate 44. This end has a ratchet 95, above which is a spring-supported plunger 95×, carrying a push-pawl on its lower end engaging with the ratchet. The upper end of the plunger is operated by the plate 44 in its descent once, and this gives one movement of elevation to the carriage 90, the parts being so proportioned that this shall equal the thickness of one blank, so that one blank is raised into range of the grasping mechanism to be transferred to the former at each descent of the former. The cross-bar 50 on the top of the plunger is made to operate the transferring devices, which feed the paper to the plate beneath the former. Upon it is an arm 100, which extends over the main feed-table 101. Supported on the main frame by a part extending over table 101 is a post 102, carrying a lever 103, said lever being pivoted at the upper end of the post and extending down near to the table, where it is connected by a link 104 and sleeve 106 to a sliding cross-bar 105. The ends of bar 105 are supported in horizontal guides 106×. The cross-bar carries a suction-pad 107, the open bell-mouth of which is downward. It is in connection with any suitable exhaust through a pipe 108. The upper end of the lever 103 is bent at 109 and has guides in which the end 110 of the cross-bar 50 works in operating the lever. The downward movement of the cross-bar 50 throws the lower end of the lever outward and carries the suction-pad over the carriage 90. At the same time the carriage is raised by the screw above described and the top sheet or blank comes in contact with the mouth of the suction-pad, which has been lowered by the inclined end of the guides 106. As the pad is under exhaust and the mouth of the pad flexible, it having a rubber or equivalent edge or a mouth of ordinary rubber tube fitting the blank, the said blank is drawn firmly against the mouth of the pad and there held. The upward movement of the plunger causes the cross-bar 50 to strike the upper part of the bend of the lever, and this throws the lower part inward, carrying the blank over paste-rolls 30 onto flipper-arms 36, which are fixed to a rock-shaft 39 in the table 101. As the pad takes hold of the forward end of the blank, it draws it over these arms. The neck of the pad is provided with a vent, on which is seated a valve 113, carried on an arm 114, said arm being provided with a spring which keeps the valve normally pressed to its seat and the vent thereby closed. By the side of the guides on which the cross-bar 105 moves is a cam 115, and as the pad is brought forward the end of the arm 114 strikes this cam and opens the vent, this causing the pad to drop the blank. The cam is arranged to cause the blank to fall exactly on the arms, and the pad moves on to the position shown in Figs. 1 and 4. When the cross-bar 105 returns to its outward position over the feed-box, the arms 36 are thrown over to the left of Fig. 4, thus turning the blank over and transferring it to the other side of the table 101 and leaving it in line with the former. As the blank is drawn by the pad over the paste-wheels, its margins are smeared with paste or glue on the under side, and when the sheet is turned the pasted margins are brought upward. The blank in this latter position is acted on by a pusher 35, Figs. 2 and 4, consisting of arms pivoted to the cross-bars 105 and having points 35×, Fig. 2, on the under sides of the forward ends to push the blanks into position. The next forward movement of this cross-bar pushes the blank under the former. This, as it takes place at the end of the upstroke, leaves the blank upon the closed trap-doors and ready to be acted upon by the former on its next downstroke. The arms 36 are thrown by quick motion over to the opposite side from the position shown in Figs. 1 and 4 and immediately return. This is accomplished by means of the bevel-gears in connection with the segment 96, operated by the adjustable rack 97 on the under side of the table 44. When the table descends near the end of the stroke, the rack engages with the segment, and through the gears 98 99 37 and the gear 38 on the flipper-shaft 39 turns the flippers quickly over and returns them on the beginning of the upward stroke to the normal position. The end blanks E are brought in and laid in place, overlapping the pasted edges at the main blank, immediately after the latter has been left in place under the former. This is accomplished by devices of the same forms as those heretofore described for moving the main blank with some modification, as the blanks E are moved directly and do not require to be pasted or turned. The devices are exactly the same at both ends and are lettered alike in the drawings. The suction-pad 120 has a suction-pipe 121, leading to the main pipe 122. It is carried on a yoke connected to a lever 123, the upper end of which is made like the lever 103 of the main blank-feeding devices, and it is operated by the end of the cross-bar 50. The ends of the yoke move in guideways 124, and as the pad is carried back by the downstroke the pad is lowered by downward bends in the guideways to the top of a screw-shaft 125, fed upward by a ratchet 127 and shaft and bevel-gears. The ratchet-wheel is operated by a plunger 128 upon the downstroke of the former, as in the carriage-feeding devices heretofore described. The pad is shown in Figs. 1, 2, 3, and 4 in its forward position, to which it brings the blanks, and the suction being released by the opening of the valve 129 the blank is then dropped and the pad goes back over it in the next backward movement, drawing back pusher-arms 130, which engage behind the blank, and in the next forward movement push it into place. The valve is operated by the same form of mechanism heretofore described, and as shown best in Fig. 4. The blanks E are moved in guideways and laid accurately, slightly overlapping the main blank, and when the plunger descends the former presses the laps firmly together and the wings turn up, as heretofore explained. In case the blanks E overlap the blank D too much the springs 6 on the former engage with the edges and push the blanks out into their correct position.

The suction-pad for removing and discharging the completed box is shown at 19. This is carried on a lever 131, pivoted on the main frame and having a bent end 132 projecting up into range with an arm 18 on the plate 44, so that at the extremity of the downstroke the lever is thrown up to cause the pad to come into contact with the bottom of the box after the wings have dropped. The mouth of the pad is made hollow, as those heretofore explained, and is connected to the exhaust by a flexible pipe 133. When the plunger returns, the arm 18 is lifted from the lever and the weight of the inner end causes it to drop and draw away the box from the former. At the extremity of its downward movement a valve (not shown) may open and let free the box.

Figures 11, 12, 13:
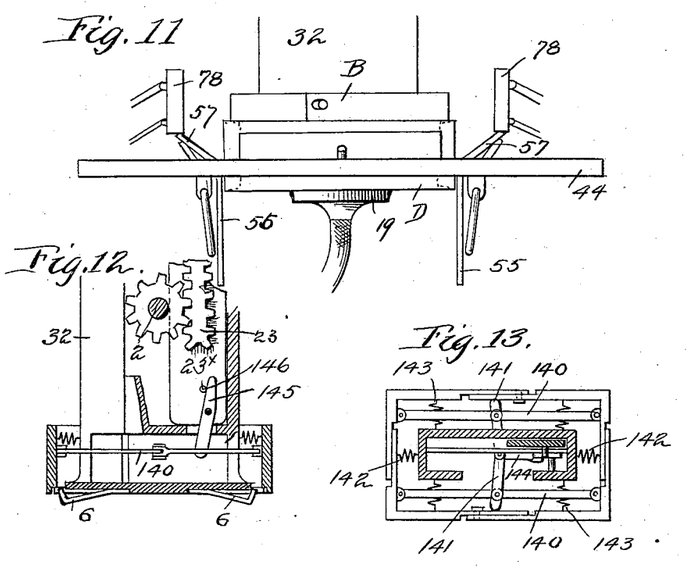
Fig. 12 shows a vertical section of the expansible former.
Fig. 13, a horizontal section of the same.

In order that the box may be more readily and easily drawn off, I have devised a collapsible former. The sides and ends of the plunger are lapped, as shown in Fig. 13, and have connecting toggle-levers 140, the latter being connected by cross-levers 141. The sides are drawn inward by the bending of levers 141, which also bend levers 140. The end pieces are connected to the plunger by springs 142, which draw the ends together, and the springs 143 draw the sides. The middle joint of the toggle 141 is connected by link 144 to a lever 145, which is operated by the end of the rack-bar 23, which on the downstroke is thrown to the right side of Fig. 12. It has a pin 146, which pushes aside the upper end of the lever and straightens the toggles, thus expanding the former. There are projecting ends of the cross-toggles 141 which bear against the sides of the former and expand it laterally, while the toggles 140 expand it longitudinally. The former thus is made to contract on the upstroke and expand on the downstroke.

The construction of the rack-bar just referred to is shown in Fig. 2, but is not herein claimed, being particularly described and claimed in an application filed by me in the United States Patent Office on the 18th day of June, 1891, having Serial No. 396,758, for a mechanical movement.

The plunger 32 is a hollow case having a slotted front, as shown in Fig. 2 at 2×. In it is a laterally-movable rack-bar 23, which has teeth on both sides and inclined teeth at the ends adapted to engage with a pinion 2, Figs. 2 and 12, in the case, the shaft of which passes through the slotted front and has a drive-wheel 1. The rack-bar is fixed to a plate or bar 23×, Figs. 2 and 12, which extends from end to end of the case and is held snugly therein, but may shift from side to side. The rack-bar travels, carrying the plunger-case with it, up on one side of the pinion, and is turned by the teeth of the pinion engaging with the inclined teeth on the end of the rack-bar, and thus goes over to the other side and is carried down by the same motion of the pinion. It is held to the pinion at the ends by the springs and the weight of the parts. The downstroke of the plunger is arrested and eased by buffer-springs 20 on the guide-posts 21.

I claim as my invention—

1. In a box-making machine, a reciprocating former, a yielding bed-plate having an opening and hinged trap-doors, mechanism for operating said trap-doors, wings for folding the blank upon the former, and mechanism for operating said wings, substantially as described.

2. In a box-machine, a reciprocating former, a yielding bed-plate having an opening and hinged trap-doors, mechanism for operating said trap-doors, wings for folding the sides and ends of the blanks upon the former and corner-presses, and mechanisms for operating said wings and corner-presses, substantially as described.

3. In a box-machine, a reciprocating plunger, a yielding bed-plate having an opening and trap-doors, hinged wings for folding the sides and ends of the blank upon the former, crank-shafts mounted on the bed-plate, and cam-rods for operating said shafts as the former advances, whereby the wings are operated, substantially as described.

4. In combination with the reciprocating plunger and former, a main frame, a bed-plate having an opening and trap-doors, and operating devices therefor, said bed-plate having springs connecting it with the plunger, a stop limiting its upward movement before that of the plunger, and devices for folding the blank upon the former, substantially as described.

5. In a box-making machine having a reciprocating plunger and former, a bed-plate frame having a bed-plate, an opening in the bed-plate, and trap-doors, folding-wings, and mechanism for operating the trap-doors and wings, guiding-posts on which the bed-plate frame slides, a stop to limit the upward movement of the bed-plate frame before that of the plunger, guides for the plunger, and springs connecting the plunger to the bed-plate frame, substantially as described.

6. In combination, the plunger, with its former, a bed-plate, means for feeding the main portion of the blanks over the bed-plate, means for feeding the end pieces E also over the bed-plate, pasting mechanism, and folding mechanism operating above the surface of the bed for folding both the sides and ends, substantially as described.

7. In combination with the plunger and former, the bed-plate and the folding-wings, a feeding mechanism for the blanks, consisting of a carriage, a suction-pad, and lever for operating the same, a reciprocating bar and guides therefor, pasting devices over which the blank is moved, blank-turning devices, a pushing-feeder for pushing the turned blank under the former, and mechanism for feeding the end blanks E, all substantially as described.

8. In combination with the reciprocating former and the yielding bed-plate having trap-doors and folding-wings, the corner presses hinged to swing up and down, and means for advancing them against the corners when down, substantially as described.

9. In combination with the reciprocating former and the bed-plate carrying trap-doors and folding-wings, the suction-pad 19 and mechanism for operating the pad, substantially as described.

10. In combination, a bed-plate having an opening, a reciprocating plunger having a former to pass into said opening, the folding mechanism to fold the blank about the former while above the bed, the said former being collapsible, and means for contracting it when below the bed-plate, substantially as described.

11. In a box-machine, a reciprocating former, a yielding bed-plate having an opening, into which said former may pass, and folding means outside the edges of the opening, with means for operating them above the surface of the bed-plate during the reciprocations thereof, substantially as described.

12. In combination, the former, the bed-plate, with an opening, a former adapted thereto, means for closing the opening, the said bed-plate being yielding, and devices for operating the closing means during the reciprocation of the bed-plate.

13. In combination, the former, with means for reciprocating the same, the yielding bed-plate, the vertically-movable table for raising the blanks step by step, the feeding devices, and the mechanism for raising the table operated by the reciprocating movement of the bed-plate, substantially as described.

In testimony whereof I affix my signature in presence of two witnesses.

JOHN G. YOUNG, Jr.

Witnesses:
WALTER P. KEENE,
C. H. WELCH.